United States Patent [19]

Mattern et al.

[11] 4,154,642
[45] May 15, 1979

[54] FALLING FILM EVAPORATOR

[75] Inventors: Konrad Mattern, Bad Homburg; Helmut Saft, Frankfurt am Main, both of Fed. Rep. of Germany

[73] Assignee: Metallgesellschaft Aktiengesellschaft, Frankfurt am Main, Fed. Rep. of Germany

[21] Appl. No.: 765,596

[22] Filed: Feb. 4, 1977

[30] Foreign Application Priority Data

Feb. 5, 1976 [DE] Fed. Rep. of Germany ....... 2604389

[51] Int. Cl.² .............................................. F25J 1/06
[52] U.S. Cl. .................. 159/13 A; 159/2 R; 159/27 D
[58] Field of Search ............... 159/13 R, 13 A, 27 D, 159/27 R, 27 B, 27 A, 27 E, 13 C, 2

[56] References Cited

U.S. PATENT DOCUMENTS

| 1,005,553 | 10/1911 | Kestner | 159/27 R |
| 3,016,067 | 1/1962 | Edmonds | 159/13 A |
| 3,132,064 | 5/1964 | Scheffers | 159/13 A |

FOREIGN PATENT DOCUMENTS 1209119 6/1968 United Kingdom .................. 159/13 A Primary Examiner—Norman Yudkoff
Attorney, Agent, or Firm—Karl F. Ross

[57] ABSTRACT

A falling-film evaporator is provided with improved means for uniformly supplying liquid to the heating tubes thereof. The means includes an arrangement whereby a substantially constant-level head of liquid is formed upon the upper tube sheet above which the heating tubes project so that the vapor can pass directly into the open ends of these tubes, the liquid being introduced into lateral openings of constant cross section for each of the tubes below the level of liquid standing on the upper tube sheet. An annular gap surrounding the array of tubes projecting upwardly from the upper tube sheet serves to feed the liquid phase to the standing liquid upon the tube sheet and the substance to be evaporated is introduced into a chamber above the upper tube sheet and is expanded therein to the pressure of the vaporator. The vapor phase passes through the open upper ends of the tubes.

6 Claims, 9 Drawing Figures

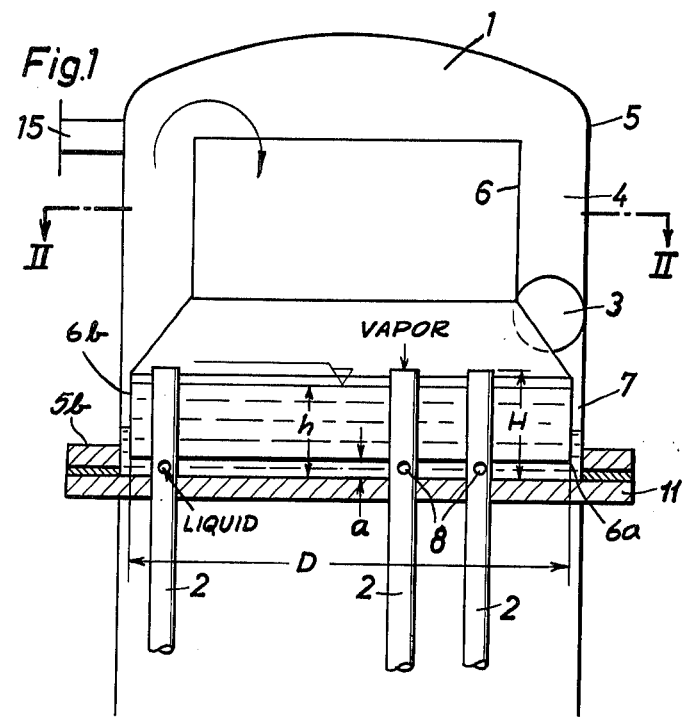
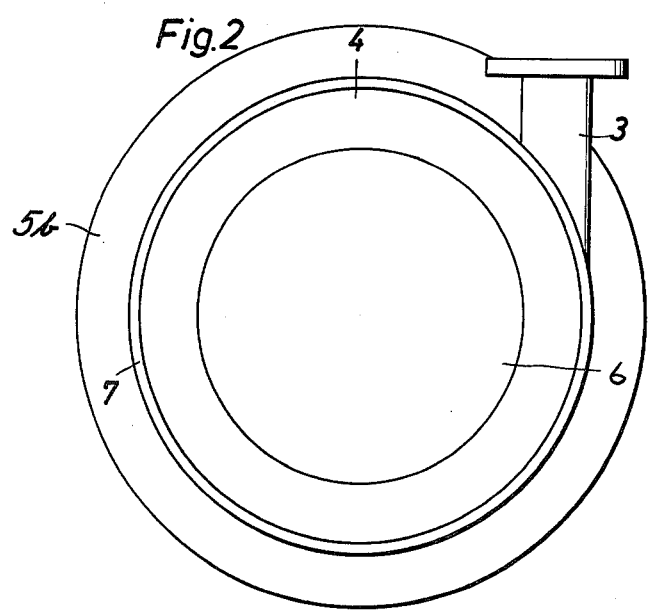

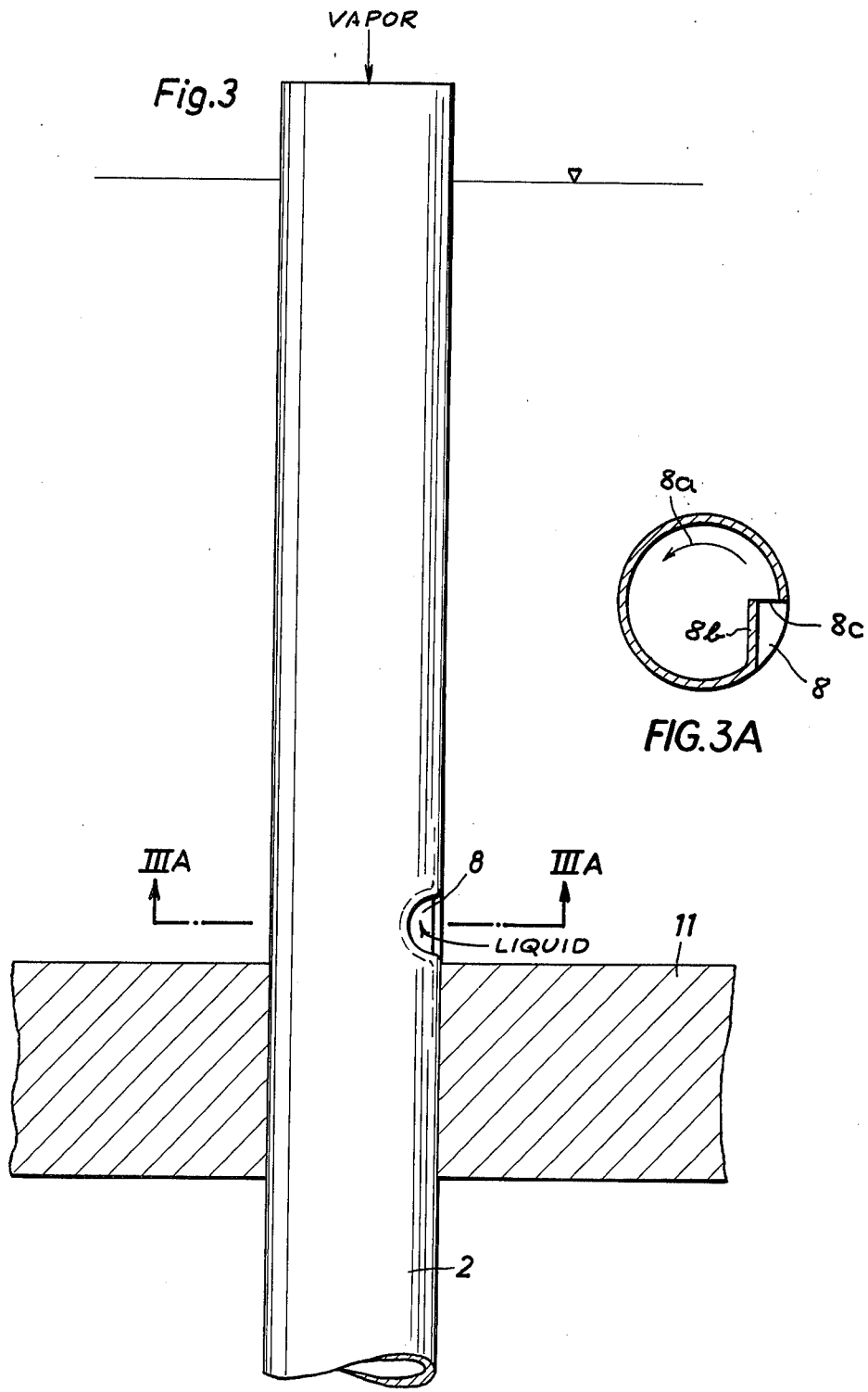

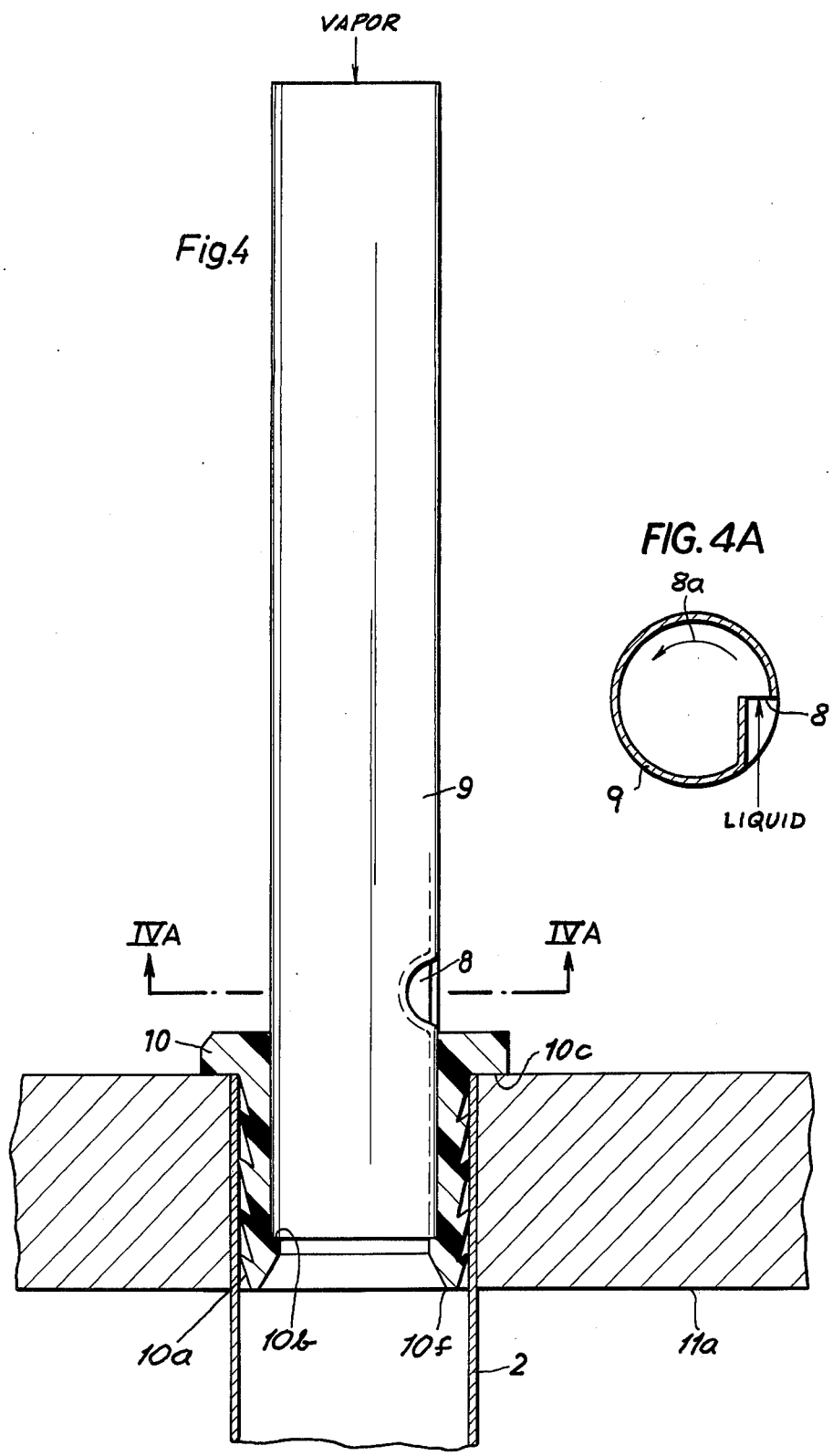

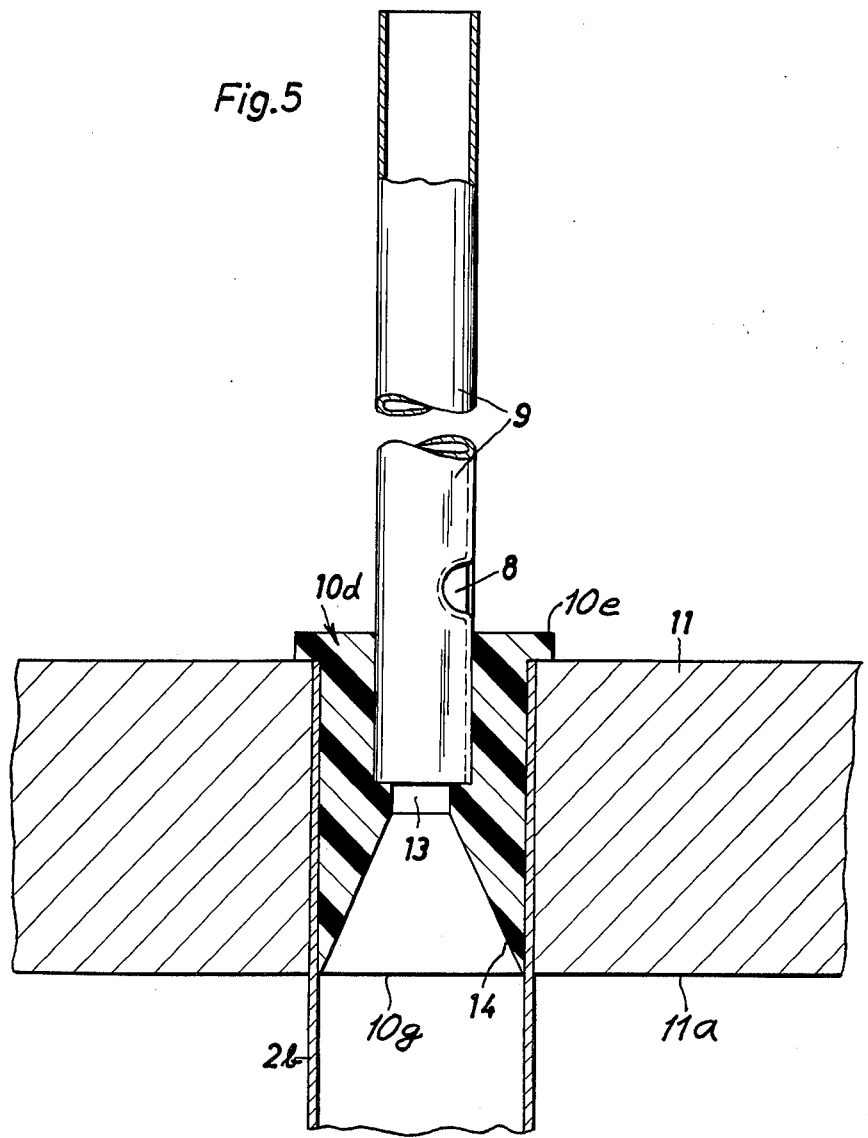

FALLING FILM EVAPORATOR

FIELD OF THE INVENTION

The present invention relates to a falling-film evaporator and, more particularly, to an apparatus for uniformly supplying liquid to the heating tubes of a falling-film evaporator.

BACKGROUND OF THE INVENTION

In a falling-film evaporator it is essential that the liquid to be evaporated be distributed as uniformly as possible to a multiplicity of generally upright heating tubes disposed between an upper tube sheet or plate and a lower tube sheet or plate, the tubes generally having their upper and lower ends flush with the upper and lower surfaces of the upper and lower tube sheets, respectively. The uniform distribution becomes increasingly important as the concentration of the liquid increases and the evaporation approaches the final concentration.

While it has been proposed heretofore to provide perforated plates or sieve plates above the upper tube sheet in order to distribute the materials of the evaporator to the heating tubes more uniformly, such perforated or sieve plates have been found to give only a coarse distribution of the material to be evaporated, particularly when the properties, e.g. viscosity, temperature or solids content of the material, vary.

It has also been proposed to provide triangular notches in heating tubes which protrude above the upper tube plate (H. Satone, *CHEMICAL ECONOMY AND ENGINEERING REVIEW*, Vol. 6, No. 5 (1974), pages 20 to 25). These notches have not been found to be successful because the pressure drop from the inlet of the evaporator to the inlet of the heating tubes varies with varying space velocities.

Elsewhere the liquid has also been distributed by means of nozzles having conical bodies disposed within the tubes. These nozzles have been found to give satisfactory results at high supply rates but have not been found to be satisfactory with high concentrations of the material to be evaporated. Furthermore, these arrangements give rise to additional energy losses because the pressure of the material to be evaporated must be increased to the value required by the nozzle having the conical filler bodies.

In printed German application (Auslegeschrift) No. 15 19 741, material to be evaporated is retained in a cup which is provided above the tube plate and the material is distributed through holes onto the upper tube sheet. In spite of the fact that this arrangement allows the material to be evaporated to be uniformly supplied to various portions of the upper tube sheet, it has been found that this arrangement does not guarantee that the material will also enter the heating tubes at equal rates. In fact, it does not do so when the material to be evaporated has entered the evaporator at a temperature above the evaporation temperature (i.e. when a supersaturated or elevated pressure condition) because vapor tends to flash off and will flow transversely to the distributed material as it flows out of the cup. The material leaving the cup, together with the material on the tube plate, is displaced toward the center of the latter and nonuniform distributions are found.

It is also known to provide the inlets of the heating tubes of a falling-film evaporator with inserts which restrict the cross section of flow so that the material to be evaporated can be retained above the openings to facilitate uniform distribution (H. Satone, *CHEMICAL ECONOMY AND ENGINEERING REVIEW*, Volume 6, No. 5 (1974), pages 20 through 25).

It has been found, with such systems, that uniform distribution is not ensured unless the material to be evaporated is at a temperature below the evaporation temperature. At temperatures above the evaporation temperatures, there is a correspondingly high variable pressure which renders ineffective throttling of the flow of liquid through openings having a predetermined cross section as to uniformity of distribution in feed of liquids into the interior of the heating tubes.

OBJECTS OF THE INVENTION

It is the principal object of the present invention to provide an improved falling-film evaporator in which the aforedescribed disadvantages are obviated.

It is another object of the invention to provide a falling-film evaporator having a multiplicity of heating tubes connected at an upper tube sheet, such that uniform distribution of the material to be evaporated is ensured and the latter can be introduced at a temperature above the boiling point of the liquid.

Still another object of the invention is to provide an apparatus for uniformly supplying liquid to the heating tubes of the falling-film evaporator.

SUMMARY OF THE INVENTION

These objects, and others which will become apparent hereinafter, are attained in accordance with the present invention by introducing material to be evaporated at a temperature above its vaporization temperature, i.e. above its boiling point at the pressure within the head of the evaporator, expanding the material to be evaporated in the head chamber above the tube sheet of the falling-film evaporator, retaining on the upper tube sheet or tube plate a substantially steady state body of liquid forming a liquid head having a height h, feeding the flashed-off vapor from the liquid (resulting from the expansion within the chamber) through the open ends of the heating tubes which project to a point above the level of liquid standing on the upper tube sheet, and controlling the volumetric rate of feed (Q) to the tubes and the height h of the retained liquid in accordance with the relationship:

$$Q = F\sqrt{2 \cdot g \cdot h}.$$

In this relationship, Q represents the volumetric liquid-feed rate in m$^3$/second, F represents the cross-sectional area flow of the inlets to the tubes in m$^2$, g represents the acceleration of gravity in m/second$^2$, and h represents the height of the liquid head in meters.

Since the flashed-off or evaporated vapor is fed into the heating tubes through the open upper ends thereof above the liquid level standing on the tube sheet, it does not interfere with the flow of liquid into the heating tubes through lateral openings in the latter disposed below the level of liquid. All of these lateral openings or all of the heating tubes have the same cross section. Since the flow rate of the liquid to each of these tubes is a function of the lateral-opening cross section and the head of liquid thereabove, it will be apparent that with a substantially static head, a uniform distribution of liquid to all of the tubes is ensured.

In the foregoing relationship, $F = n \times f$, where n is the number of heating tubes and f is the lateral-opening cross section for each of the tubes in m². As noted, Q represents the rate of flow of the liquid phase to the tubes, i.e. the rate at which the material to be evaporated is fed to the tubes.

The material to be evaporated, which is at or below the evaporation temperatures can be supplied, in accordance with a feature of the invention, to the chamber above the upper tube sheet with heated vapor from a foreign source such that the material to be evaporated is heated as much as possible and is at least partly flash vaporized so that the surplus vapor can flow into the open ends of the heating tubes. In other words, when the material to be evaporated is introduced at or below the evaporation temperature at, for example, the pressure within the evaporator, steam or some other foreign heating source can be simultaneously supplied so that the mixture will undergo heating and flash evaporation in the manner described previously.

According to still another feature of the invention, the head of the falling-film evaporator is provided with an insert body which defines, around the array of upstanding ends of the heating tubes above the upper tube sheet, an annular gap into which the material to be evaporated is expanded, the liquid phase flowing downwardly through this gap and into the substantially static liquid head disposed above the tube sheet and surrounding the projecting portions of the heating tubes.

More specifically, a preferred mode of operation according to the invention involves pressure relieving the material to be evaporated in an annular chamber or gap communicating with the pressure head below the edge of the insert body so that the material to be evaporated can flow inwardly to the pressure head or static reservoir from the outer periphery of the bank of tubes in accordance with the relationship:

$$Q = F\sqrt{2 \cdot g \cdot h}$$

to the liquid which is retained within the latter body. In this case, $F = F' = Da$, where D is the diameter of the annular gap and a is the height, measured parallel to the axis of the falling-film evaporator, at which the lower edge of the body is disposed above the upper tube sheet.

According to the apparatus aspects of the present invention, the heating tubes project above the upper tube sheet or plate to a height H which is, of course, greater than h and is advantageously greater than the intended maximum height of the retained liquid on the upper tube sheet. The lateral openings of the tubes are provided just above and preferable directly adjacent the upper surfacr of this upper tube sheet or tube plate.

In accordance with another preferred feature of the invention, the heating tubes are formed in two parts, i.e. the lower portion received in the upper tube sheet and extending downwardly substantially the full length of the falling-film evaporator over its effective evaporator region, and a standpipe fitted into each heating tube and projecting above the upper surface of the upper tube sheet. The standpipe is formed with a lateral opening under the intended level of the retained liquid. Still another feature of the invention resides in forming each of these lateral openings of diminsions and configuration such that the inflowing liquid describes a circular motion as it flows along the inner wall of the respectove heating tube. More specifically, the lateral openings communicate tangentially with the interior of the respective heating tubes.

It has been found to be advantageous to connect the standpipes with the open ends of the lower heating-tubes portions by plugs which are snugly fitted into the upper ends of the heating tubes and snugly receive the lower ends of the standpipes. The standpipe and plug may be formed unitarily, e.g. of a synthetic-resin material, because these parts do not participate in the heat exchange.

According to another feature of the invention, each plus which retains a standpipe in a respective heating tube has a passage which is narrower than the internal cross section of the standpipe and which merges into a downwardly widening diffuser-like passage. This arrangement ensures that a rotating film of liquid will result below each inlet opening and brings about a pressure drop at the constriction without affecting the relation $Q = F\sqrt{2 \cdot g \cdot h}$. With this arrangement, therefore, the material to be evaporated is particularly uniformly distributed on the inner surface of each evaporator tube.

The significant advantage of the present invention is that it eliminates the drawbacks involved in the prior-art devices as described and ensures a uniform distribution of the liquid phase into each heating tube regardless of the varying properties of the material to be evaporated and the temperature thereof, and without interference by the vapor phase which is formed by flash of operation in the chamber into which the material to be evaporated is initially introduced.

BRIEF DESCRIPTION OF THE DRAWING

The above and other objects, features and advantages of the present invention will become more readily apparent from the following description, reference being made to the accompanying drawing in which:

FIG. 1 is a diagrammatic vertical elevational view of the head of a falling-film evaporator according to the present invention, provided with the improved means for distributing the material to be evaporated to the heating tubes thereof;

FIG. 2 is a diagrammatic cross-sectional view taken along the line II—II of FIG. 1;

FIG. 3 is a detail view of the relationship of one of the heating tubes to the upper tube sheet;

FIG. 3A is a cross-sectional view taken along the line IIIA—IIIA of FIG. 3;

FIG. 4 is a view similar to FIG. 3 illustrating another embodiment of the invention in which a standpipe is fitted into the upper end of a heating tube;

FIG. 4A is a cross-sectional view taken along the line IVA—IVA of FIG. 4;

FIG. 5 is a view similar to FIG. 4 illustrating another embodiment of the invention.

SPECIFIC DESCRIPTION

Figure 1A:
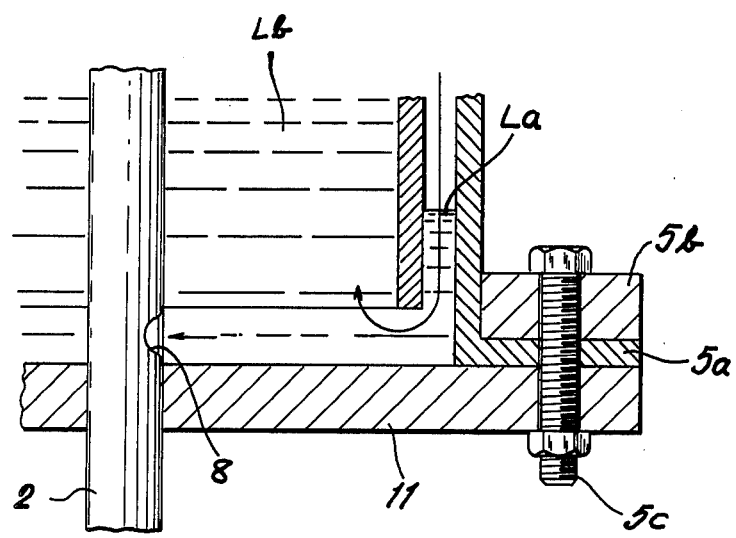
FIG. 1A is a detail view of the lower edge of the insert body showing the communication between the standing head of liquid on the tube sheet and the annular gap.

In FIGS. 1 and 2 we have shown the upper end of a falling-film evaporator having an upper part or head 1 defining an annular chamber 4 surrounding an insert body 6 which is cylindrical at its upper end, frustoconically diverges at an intermediate portion, and has a cylindrical apron at its lower end. The cylindrical apron has a lower edge 6a terminating at a distance a above the upper tube sheet or plate 11. The diameter of the apron 6b is represented at D in FIG. 1.

A connecting pipe 3 forms an inlet for the material to be evaporated and opens laterally into the cylindrical wall 5 of the upper part 1 generally tangentially as illustrated in FIG. 3, above the annular gap 7 defined between the apron 6b and the cylindrical wall or shell 5.

A multiplicity of heating tubes extend the length of the evaporator zone of the falling-film evaporator and are anchored in the upper tube sheet 11, projecting thereabove to a distance greater than h which represents the standing liquid head upon the latter. In FIG. 1A the standing liquid feeding the heating tubes 2 is represented at Lb while the liquid supplied to this standing body of liquid through the annular gap 7 is represented at La. The heating tubes or evaporator tubes 2 are formed with lateral openings 8 which, as can be seen in FIG. 3, are disposed directly adjacent the upper surface of the upper tube sheet 11 and are formed with guide walls 8b and orifices 8c inducing a generally tangential influx of liquid so that the latter swirls around the inner wall of each heating tube as represented by the arrow 8a (FIG. 3A).

As is further illustrated in FIG. 1A, the upper part 1 of the falling-film evaporator can be connected to the plate 11 by a flange 5a, a ring 5b, and bolts 5c angularly equispaced about the flange.

The vapor enters the top of each tube 2 above the liquid level as represented in FIG. 3, while the liquid phase passes through each lateral opening 8 as previously mentioned. A foreign vapor, e.g. heating steam, can be introduced at 15 into the chamber formed within the shell 5. Generally, however, the material to be evaporated is introduced at a temperature sufficiently above the vaporization temperature within the evaporator through the inlet 3 and expands in the chamber so that the liquid phase passes through the annular clearance 7 (liquid La) while the vapor phase passes over the upper edge of the tubular body 6 and enters the heating tubes at their upper opened ends.

FIGS. 4 and 4A illustrate a modification of the structure of FIG. 3 in which the heating tubes are subdivided. In this case, each heating tube 2a terminates flush with the upper surface of the upper tube sheet 11 while a standpipe 9 is fitted snugly into a plug 10 which is driven into the interior of the heating tube 2a. The lower end 10f of the plug can terminate flush with the bottom surface 11a of the tube sheet and the periphery of the plug can be barbed as shown at 10a to ensure firm anchorage of the plug within the heating tube 2a. A shoulder 10c at the upper end of the plug prevents the plug from being lost in the heating tube. A further shoulder 10b forms a seat for the lower end of the standpipe 9 which is provided with the aforementioned lateral opening 8 directly above the upper surface of the plug which, in turn, is disposed closely adjacent the upper surface of the upper tube sheet 11.

Another modification, generally similar to that of FIGS. 4 and 4A has been represented in FIG. 5 wherein the plug 10d has the shoulder 10e previously mentioned and a lower end 10g flush with the underside of the plate 11. In this embodiment, however, at the discharge end of the standpipe 9, the plug is formed with a constriction 13 which merges with a diffuser passage 14 conically diverging downwardly.

Figure 6:
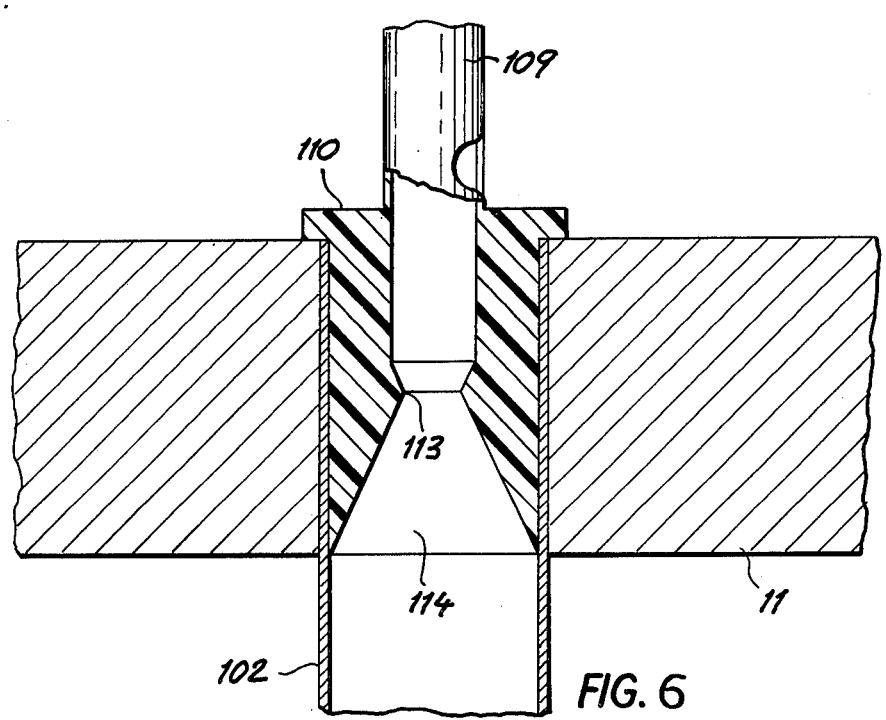
FIG. 6 is another view similar to FIG. 4 showing still another embodiment of the standpipe arrangement in which the standpipe is integral (unitary) with the plug fitted into the heating tubes.

In the modification shown in FIG. 6, the heating tube 102 receives a plug 110 which is formed unitarily with the standpipe 109 of a synthetic resin and has the constriction 113 and the diffuser passage 114 also formed unitarily therein.

SPECIFIC EXAMPLE

A ten-stage falling-film evaporator plant is provided for the distillation of seawater. Each of the stages has a falling-film evaporator with the general construction illustrated in FIG. 1.

In the first stage of the ten-stage falling-film evaporator plant for distilling seawater, seawater at a temperature of 106° C. is supplied at a rate of 150 m$^3$/hour into the upper part of the evaporator 1 and is uniformly distributed to 769 evaporator tubes 2 in which a pressure of 1 kg/cm$^2$(absolute) prevails. As is aparent from FIG. 2, the seawater enters tangentially through the pipe 3 into the annular chamber 4 defined between the shell 5 and the internal fixture 6.

The seawater is expanded to the evaporation pressure, thereby flashing off steam at a rate of about 1500 kg/hr. The steam flows over the top of the insert body 6 and into the latter and thence into the open ends of the tubes 2 above the body of water accumulated on the upper tube sheet 11.

The seawater is cooled to about 101° C. by expansion and flows downwardly to the tube sheet 11 through the annular gap 6. Each opening 8 has an area of 35 mm$^2$ and the liquid is retained to a height h of 200 mm around the protruding ends of the evaporator tubes. The liquid flows tangentially into each of these tubes substantially uniformly and is uniformly distributed along the inner wall of each tube.

In the tenth stage of the plant, the evaporation is effected at a pressure of 0.12 kg/cm$^2$ (absolute) and the rate of feed of the seawater is reduced to about 70 m$^3$/hr by the evaporation in the preceding stages. The brine enters the evaporator at a temperature of 55° C. and is subjected to flash evaporation to produce water vapor at a rate of about 500 kg/hr. In this case, the water vapor flows off to the separator through the tubes 2 and cannot build up a significant distributing pressure. When necessary, where the temperature of the water is below the evaporation temperature in each unit, steam is supplied via pipe 15 from the exterior.

We claim:

1. In a falling-film evaporator comprising a horizontal upper tube sheet, a multiplicity of vertical evaporator tubes received in said upper tube sheet and projecting thereabove and means forming a chamber above said upper tube sheet and communicating with upper ends of said tubes, the improvement which comprises:

means for expanding material to be evaporated into said chamber and thereby forming a vapor phase passing into said tubes through the upper ends thereof and a substantially static body of a liquid phase in said chamber a level below the upper ends of said tubes so that said static body has a height less than the height of said upper ends above said tube sheet;

means including a multiplicity of lateral openings respectively formed in said tubes proximal to said tube sheet and below said level for admitting liquid from said body into said tubes, all of said openings having substantially the same cross section;

an apron in said chamber surrounding said multiplicity of evaporator tubes and reaching downwardly toward said tube sheet while defining an annular gap therewith; and an inlet for said material to be evaporated opening into said chamber between said apron and a wall of said chamber, said inlet being oriented to impart a tangential motion to the material introduced.

2. The improvement defined in claim 1 wherein each of said tubes comprises a lower tube portion extending downwardly from said tube sheet and a standpipe extending upwardly from said lower tube portion and communicating therewith while being formed with the respective lateral opening above said tube sheet.

3. The apparatus defined in claim 2, further comprising a plug fitted onto each of said lower tube portions and connected to the respective standpipe.

4. The apparatus defined in claim 3 wherein each of said standpipes is formed unitarily with the respective plug.

5. The apparatus defined in claim 3 wherein each of said plugs is formed with a constriction below the respective standpipe and a downwardly widening passage extending from said constriction and forming a diffuser.

6. The apparatus defined in claim 1 wherein each of said openings is dimensioned and oriented to admit liquid into the respective evaporator tube in a generally tangential direction.

* * * * *